United States Patent [19]

Ochiai

[11] 4,125,296
[45] Nov. 14, 1978

[54] SKID CONTROL SYSTEM FOR VEHICLES

[75] Inventor: Takeshi Ochiai, Toyota, Japan

[73] Assignee: Toyota Jidosha Kogyo Kabushiki Kaisha, Aichi, Japan

[21] Appl. No.: 669,477

[22] Filed: Mar. 23, 1976

Related U.S. Application Data

[60] Continuation of Ser. No. 510,032, Sep. 27, 1974, abandoned, which is a division of Ser. No. 270,584, Jul. 11, 1972, Pat. No. 3,848,933, which is a continuation-in-part of Ser. No. 109,465, Jan. 25, 1971, abandoned, and Ser. No. 109,461, Jan. 25, 1971, abandoned.

[30] Foreign Application Priority Data

Jan. 26, 1970 [JP] Japan ................................. 45-6312
Jan. 27, 1970 [JP] Japan ................................. 45-6743
Aug. 5, 1970 [JP] Japan ................................. 45-67971

[51] Int. Cl.$^2$ ............................................. B60T 8/10
[52] U.S. Cl. ................................. 303/109; 188/181 C
[58] Field of Search ............. 180/82 R, 82 D, 105 E; 188/181 C; 244/111; 303/20, 96, 105, 106, 109, 110; 317/5; 318/52; 324/161; 340/53, 62; 361/238, 242

[56] References Cited

U.S. PATENT DOCUMENTS

| 3,612,622 | 10/1971 | Riordan ................................. 303/109 |
| 3,650,575 | 3/1972 | Okamoto ........................... 303/109 X |
| 3,690,735 | 9/1972 | Arai et al. ............................ 303/109 |
| 3,768,873 | 10/1973 | Hirzel ................................... 303/109 |
| 3,897,114 | 7/1975 | Scharlack ............................ 303/110 |

FOREIGN PATENT DOCUMENTS 909,255  10/1962  United Kingdom ..................... 303/109

Primary Examiner—Stephen G. Kunin
Attorney, Agent, or Firm—Toren, McGeady and Stanger

[57] ABSTRACT

In a skid control system a pressure modulator reduces the pressure applied by a master cylinder to a wheel cylinder when the wheel velocity as measured by a wheel detector decreases faster than a deceleration predetermined by a deceleration control. A control unit which regulates the pressure modulator corrects the predetermined deceleration when the wheel has exceeded the slip ratio at which the coefficient of friction is maximum so as to achieve an optimum deceleration that corresponds to the road surface condition. The control unit induces the pressure modulator to reduce the pressure of the brake fluid and restore the wheel velocity when the coefficient of friction of the wheel reaches the maximum. Emergency braking is thus performed with an average slip ratio at which the coefficient of friction is maximum. A comparator circuit compares the wheel velocity with a signal from the control unit indicative of the velocity of the predetermined decelerator to determine when the wheel velocity has decreased faster than the predetermined deceleration.

10 Claims, 16 Drawing Figures

FIG. 1 PRIOR ART
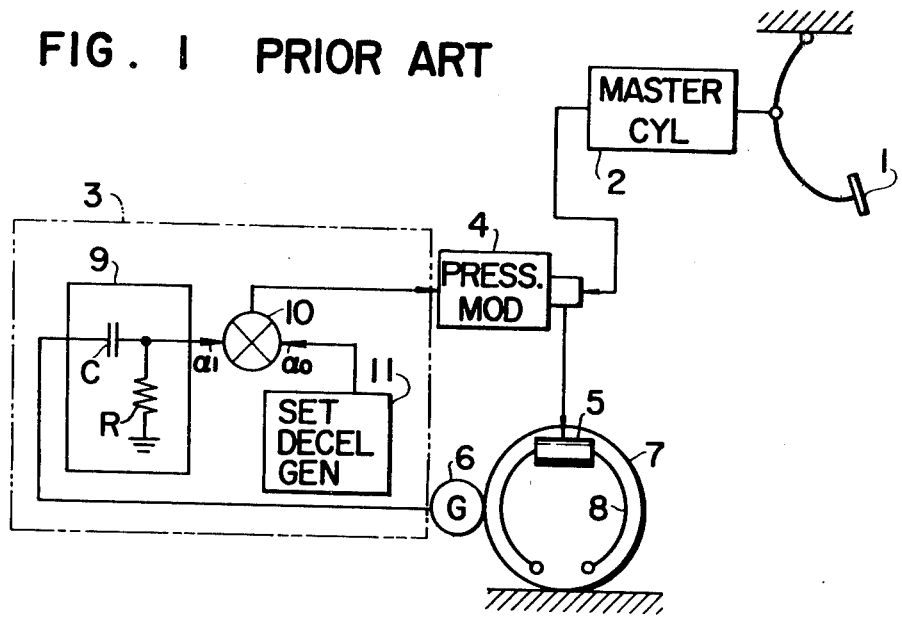
FIG. 3
FIG. 4
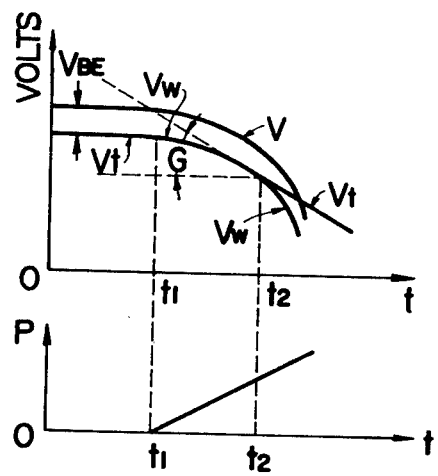
FIG. 5
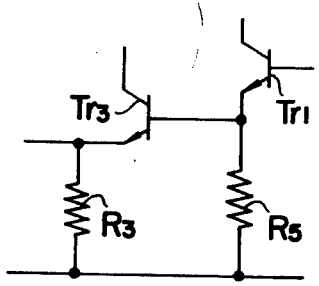

FIG. 6
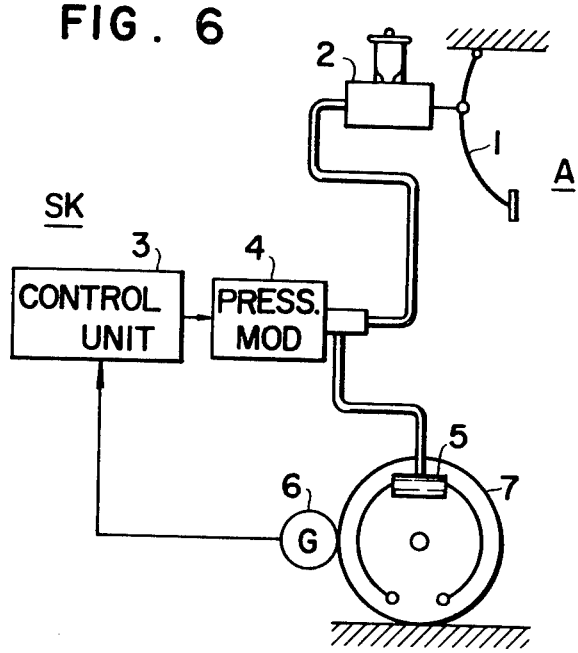
FIG. 7
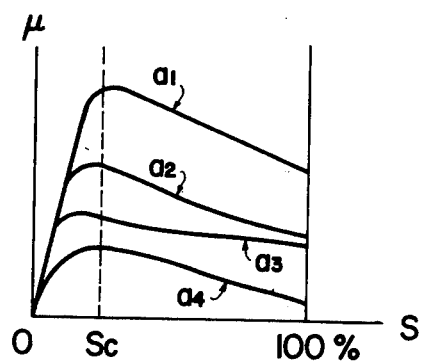
FIG. 8a
FIG. 8b
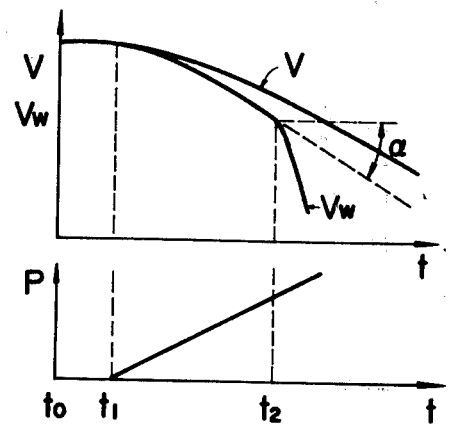

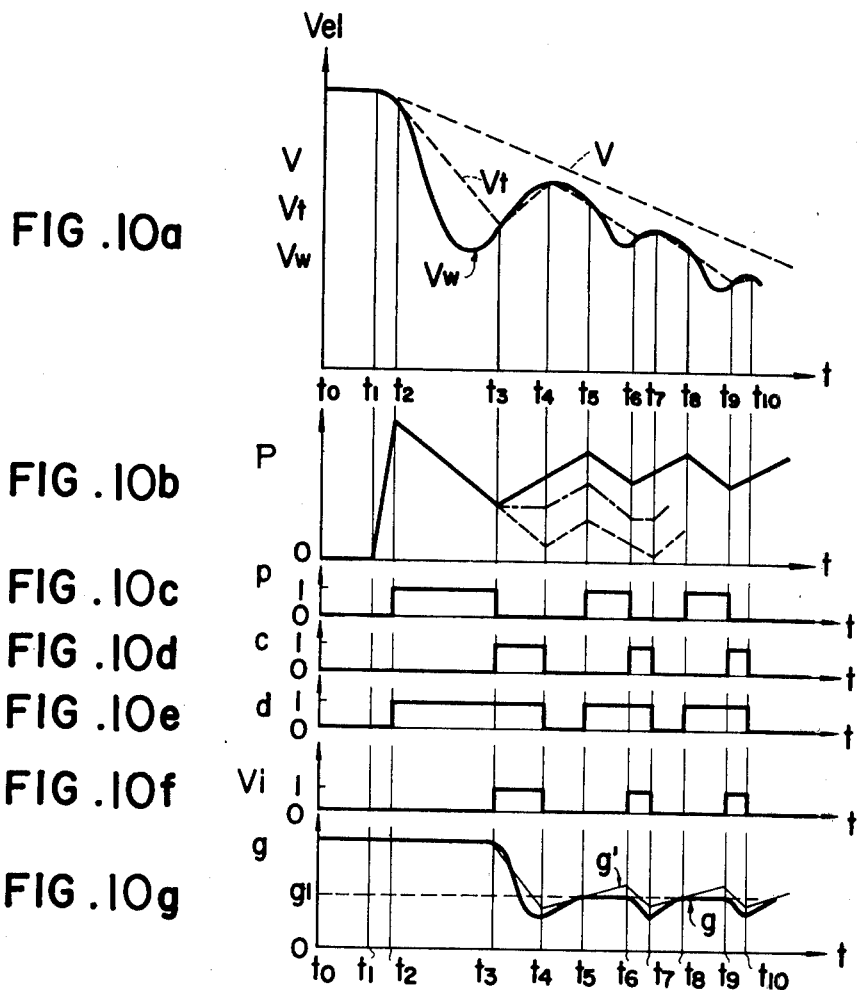
FIG. 10a
FIG. 10b
FIG. 10c
FIG. 10d
FIG. 10e
FIG. 10f
FIG. 10g
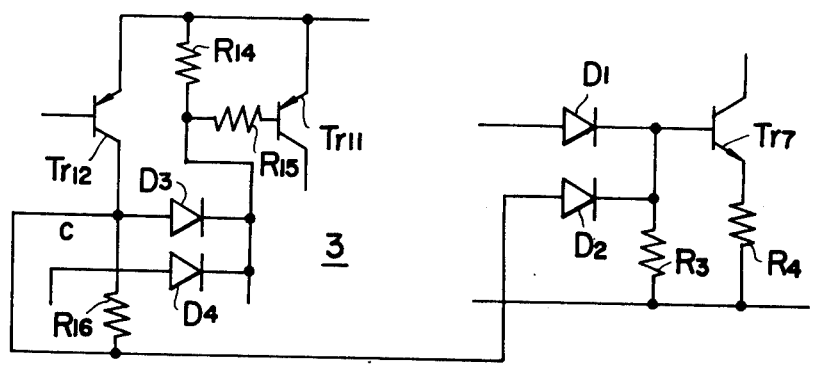
FIG. 11

FIG. 13
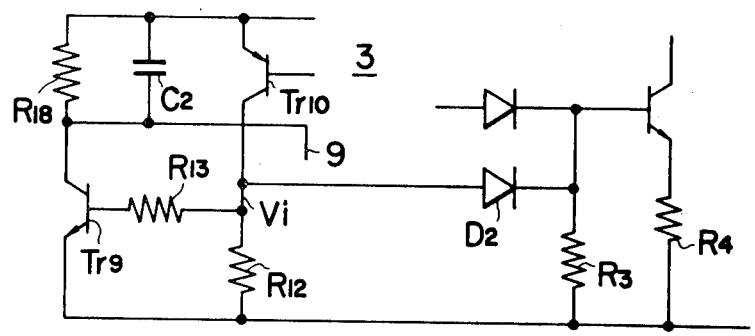
FIG. 14
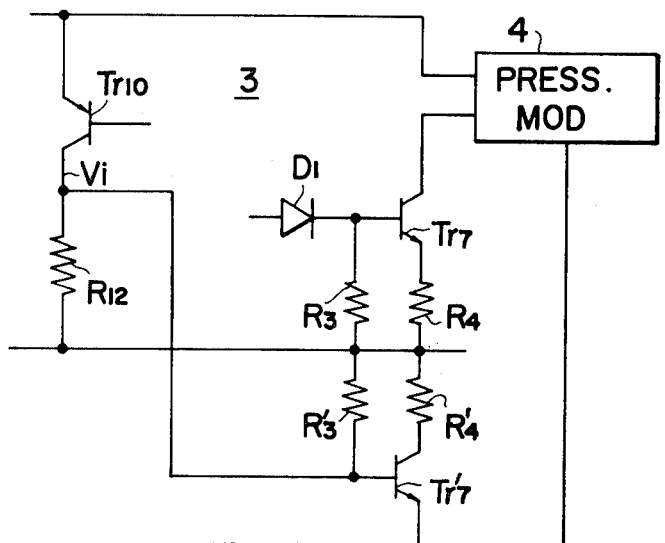
FIG. 16
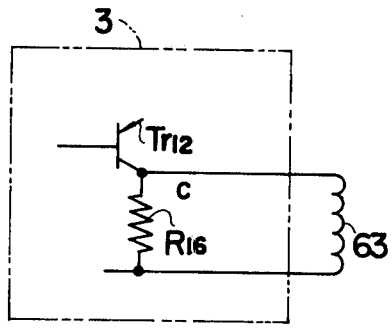
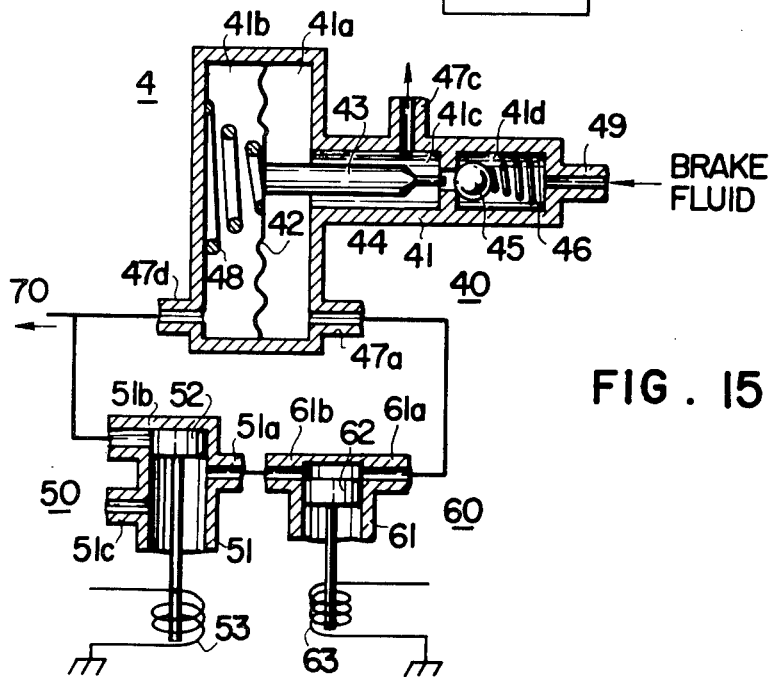
FIG. 15

SKID CONTROL SYSTEM FOR VEHICLES

This is a continuation of application Ser. No. 510,032 filed Sept. 27, 1974, now abandoned, which is a division of application Ser. No. 270,584 filed July 11, 1972, now U.S. Pat. No. 3,848,933, which in turn was a continuation-in-part application of Ser. No. 109,465 and Ser. No. 109,461, now abandoned.

BACKGROUND OF THE INVENTION

This invention relates to skid control systems for the brakes of vehicles, such as automobiles and the like; and particularly to systems which prevent an operator from losing control of a vehicle, due to locking of the wheels, by regulating the effectiveness of the brakes in dependence upon the road surface conditions, and regardless of the pedal effort, during an emergency stop.

The invention has particular, although not exclusive reference, to systems for regulating the pressure of brake fluids applied to the wheel cylinders of a brake.

A skid control system may be composed of a wheel velocity detector, a control unit and a pressure modulator for modulating the pressure of brake fluid. In such a skid control system, a deceleration is preset as a desired limit on the basis of road surface conditions which are indirectly detected from factors, such as changes in the wheel velocity. The control unit compares the preset deceleration with the actual wheel deceleration. The latter is derived from the wheel velocity as detected by the wheel velocity detector. The comparator issues pressure reduction signals to the pressure modulator when the wheel deceleration exceeds the preset deceleration. The pressure modulator responds by reducing the pressure of the brake fluid.

Known methods for determining the actual wheel deceleration employ a differentiation circuit composed of resistors and capacitors. The differential value of wheel velocity is then used as the wheel deceleration.

It is difficult to obtain accurate indications of actual wheel decelerations by means of differentiation circuits, because at the low frequency at which the velocity varies, namely on the order of several Hertz, it is difficult to obtain exact differential values. Moreover, the differential signal obtained is subject to distortion by noise. This results in skid control systems with unstable performance.

Also, skid control systems are required to perform their braking functions so as to achieve minimum stopping distances while preventing the wheels from locking. Under such circumstances it is desirable that braking be accomplished when the coefficient of friction between the wheels and the road surface is maximum. Hitherto it has been assumed that the point of maximum coefficient of friction is usually in the range of 0.15 – 0.2 of the wheel slip ratio. Consequently, systems have been used wherein a constant slip ratio control falling within this range is set and utilized to regulate a pressure modulator. In such systems, if the slip ratio at which the coefficient of friction is maximum, varies because of changes in the road surface or because of changes in the condition of the road surface or because of changes in the shapes of tires or for any number of reasons, skid control is reduced.

An object of this invention is to improve skid control systems.

Another object of this invention is to obviate the disadvantages of previous skid control systems.

Still another object of the invention is to render skid control systems responsive to a number of variables, such as the kind of road surface and its condition.

Yet another object of the invention is to adjust the skid control system continuously for various road conditions and other variables, yet another feature of the invention is to adjust skid control systems in a manner most appropriate for braking a vehicle with a slip ratio having the maximum coefficient of friction.

SUMMARY OF THE INVENTION

According to a feature of the invention, the deficiencies of prior art deceleration controls and skid control systems are obviated by circuit means which respond to the wheel velocity for forming the control signal corresponding to the velocity sensed, regulator means which establish an indication representative of a predetermined limit to the deceleration, and network means responsive to the regulator means and coupled to the circuit means which inhibit the changes in the value of the control signal formed by the circuit means when the changes occur at a rate greater than the indication. Electrical means respond to the control signal to produce an output when the change in the value of the control signal is inhibited.

According to another feature of the invention, control means respond to the electrical means to modulate the braking effect of a vehicle's braking system and sensing means sense the speed of a wheel of a vehicle.

According to another feature of the invention, the network means includes a capacitor responsive to the control signal of the circuit means. It also includes a current flow control device, such as a transistor current amplifier, responsive to the indication of the preset deceleration, which controls the rate of discharge of the capacitor. When the rate of discharge of the capacitor no longer follows the actual velocity, the electrical means detect this unbalance and cause the control means to modulate the braking effect.

According to another feature of the invention, the electrical means constitutes a differential comparator circuit.

According to another feature of the invention, the braking force on the wheel of a vehicle is adjusted so that it decreases when the wheel velocity decreases faster than the predetermined limit and by adjusting the rate on the basis of changes of wheel velocity.

According to another feature of the invention, the predetermined deceleration limit is adjusted downwardly on the basis of how long the wheel velocity requires to start decreasing after the brake effort has increased in response to a wheel velocity increase.

According to another feature of the invention, the predetermined deceleration limit is readjusted on the basis of the time required for the rate of the decrease in wheel velocity to surpass the set deceleration.

According to still another feature of the invention, control means respond to the velocity of the wheel for producing a signal whe the wheel velocity decreases faster than a given deceleration limit, brake means decrease the braking effect of the system in response to the signal and reverse the decrease in the absence of the signal, velocity change responsive means in the control means produce a first indication in response to increases in the wheel velocity and a second indication in response to decreases in the wheel velocity, during the absence of the signal, and setting means respond to the control means for adjusting the given deceleration limit downwardly in response to first indication and upwardly in response to the second indication.

According to yet another feature of the invention, regulating means respond to the setting means for decreasing the braking effect of the system during the first indication, even in the absence of the signal.

According to still another feature of the invention, maintainance means cause the brake system to maintain the braking effect at the onset of the first indication and throughout the first indication.

According to yet another feature of the invention, the brake modulation means vary the brake fluid pressure to a brake cylinder from a master cylinder.

The invention is based upon the recognition that if the slip ratio of the wheels exceed the slip ratio that occurs at the maximum coefficient of friction, when the pressure of the brake fluid is increased linearly, the deceleration increases rapidly and therefore the wheel velocity decreases rapidly. In effect the invention detects the time when the wheel deceleration increases rapidly.

These and other features of the invention are pointed out in the claims. Other objects and advantages of the invention will become apparent to those skilled in the art from the following detailed description, when read in light of the accompanying drawing.

BRIEF DESCRIPTION OF THE DRAWINGS

FIG. 1 is a schematic drawing illustrating a skid control system mounted in a brake line according to the prior art;

FIG. 3 is a characteristic diagram illustrating the variations in voltages at various times for variation in pressures shown in FIG. 4;

FIG. 4 is a diagram illustrating the change in pressure of the brake fluid which creates the voltages in FIG. 3;

FIG. 5 is a schematic circuit diagram illustrating another embodiment of a portion of the circuit in FIG. 1.

FIG. 6 is a schematic drawing illustrating a brake arrangement with a skid control system each embodying features of the invention.

FIG. 7 is a graph illustrating various characteristics of coefficients of friction for wheel slip ratios in vehicles, such as those in FIG. 6;

FIG. 8a is a graph illustrating changes in wheel velocity as compared to the vehicle velocity in a vehicle, such as that illustrated in FIG. 6, as these velocities change with respect to time;

FIG. 8b is a presure time diagram illustrating the change in fluid pressure in the master cylinder of FIG. 6;

FIGS. 10a–10g are graphs illustrating various velocities and voltages of portions of the system in FIGS. 6 and 9;

FIG. 11 is a schematic diagram illustrating another embodiment of the control unit in FIGS. 6 and 9 but showing only those portions of the control unit that differentiates this control unit from the control unit in FIG. 9;

FIG. 13 is a schematic diagram of a variation of the control unit in FIG. 12;

FIG. 14 is a schematic diagram illustrating still another variation of the embodiment of the control unit illustrated in FIG. 12;

FIG. 15 is a partly schematic and partly sectional diagram of the pressure modulator in FIGS. 6, 9, 12 and 14; and FIG. 16 is a schematic diagram of another variation of the embodiment of FIG. 12.

DESCRIPTION OF PREFERRED EMBODIMENTS

Figure 2:
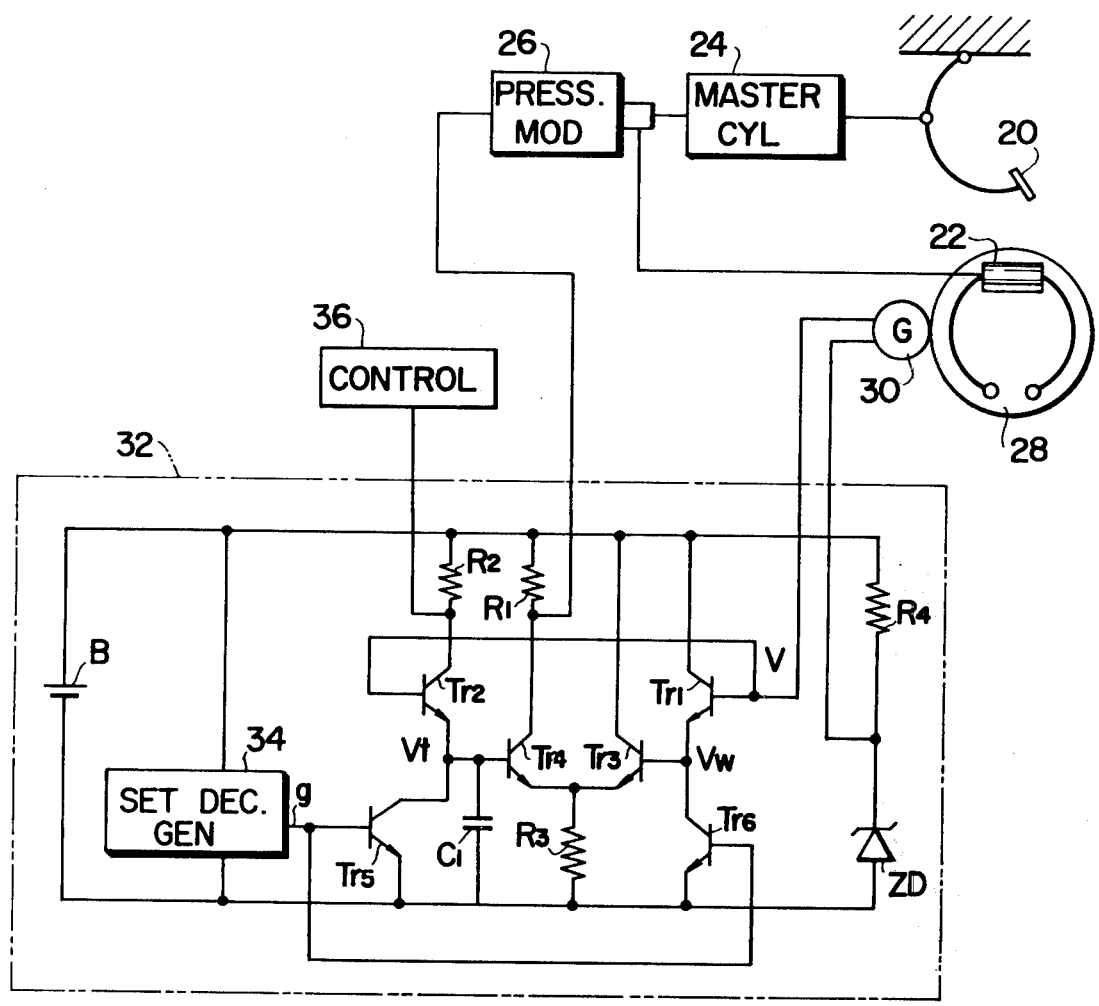
FIG. 2 is a schematic diagram illustrating a skid control system embodying features of the invention.

In the prior art skid control system of FIG. 1, a brake pedal 1, when depressed, actuates a master cylinder 2. A control unit 3 electrically controls a pressure modulator 4. The latter, in response to the control unit 3, modulates the pressure which the master cylinder 2 applies to a wheel cylinder 5 of a wheel 7 whose velocity and acceleration is to be controlled. A wheel velocity or speed of wheel 7 is electrically connected to the control unit 3.

Under normal travel conditions, where the skid control system is not required to operate, the pressure of brake fluid derived from the master cylinder 2 and conforming to the physical effort applied to the brake pedal 1, is applied in unaltered condition to the wheel cylinder 5. This provides braking force to the wheel. If there is danger of the wheel locking during an emergency stop, the control unit 3 of the skid control system issues a pressure reduction signal. Upon receipt of this signal, the pressure modulator decreases or shuts off the flow of brake fluid from the master cylinder. This regulates the pressure of brake fluid in the wheel cylinder. In a control unit 3, the actual wheel deceleration is measured by a differential circuit 9 and compared by a comparator circuit 10 with the output of a set deceleration generator 11. The latter establishes a signal corresponding to a desired maximum deceleration $\alpha_0$. The term "maximum deceleration" for the deceleration $\alpha$ is used to indicate that it represents a desired limit for vehicle deceleration based on prevailing road conditions and the like. When the actual deceleration $\alpha_1$ as measured by the differentiator 9, exceeds the deceleration $\alpha_0$, the comparator 10 actuates the pressure modulator. The differentiator 9 is composed of a series capacitor C and shunt resistor R in the usual manner.

As expressed earlier, the problems of devices, such as those in FIG. 1, lie generally in the differentiation circuits, such as 9, which are bulky and inaccurate at the frequencies with which the wheel velocities change, namely a few Hertz. Their output signals are also subject to distortion by noise.

In FIG. 2, the skid control system which embodies features of the invention has an overall operation comparable to that of FIG. 1. Specifically downward pressure on a pedal 20, corresponding to the pedal 1, applies pressure to a wheel cylinder 22 by means of a master cylinder 24 that operates through a presure modulator 26. The master cylinder 24 and presure modulator 26 as well as the wheel cylinder 22 corresponds to the comparable elements 2, 4 and 5 in FIG. 1. The wheel cylinder 22 applies a braking effort to a wheel 28 that corresponds to the wheel 7. A wheel velocity detector 30 corresponding to the wheel velocity detector 6 furnishes a wheel velocity signal to a control unit 32 that regulates the pressure modulator 26. The latter then controls the fluid pressure from the master cylinder 24 to the brake cylinder 22, thereby controlling the braking effect on the wheel 28 in dependence upon the wheel velocity detector 30.

Within the control unit 32 the bases of two transistors Tr1 and Tr2, having the same characteristics, receive a voltage proportional to the wheel speed from the wheel velocity generator 30 at their respective bases. Added to the voltage of the wheel velocity genrator is a constant voltage established across a Zener diode ZD by a resistor $R_4$ and a bettery power source B. The junction of the resistor $R_4$ and the Zener diode ZD forms a constant voltage driving point to establish a stable reference voltage for the generator 30. A transistor Tr6 has a main path of current flow that serves a load circuit in the emitter circuit of transistor Tr1. Loading the emitter of the transistor Tr2 is a capacitor $C_1$. A charging resistor $R_2$ forms a current path from the collector of transistor Tr2 to the positive terminal of the battery power source B. The main current flow path of a transistor Tr5 forms a directly parallel discharge path across capacitor $C_1$. The effect of the discharge path is determined by the voltage output of a preset deceleration generator 34 corresponding to the set deceleration generator 11. The set deceleration generator 34 controls the transistor Tr5 as well as the transistor Tr6 by applying a voltage g to their respective bases.

When a voltage V corresponding to the wheel velocity is applied by the wheel velocity generator 30 to the bases of transistors Tr1 and Tr2, their conduction causes voltages Vw and Vt to appear at the emitters of transistors Tr1 and Tr2. These voltages are lower than the voltage V by the base-emitter voltage $V_{BE}$. The voltage of the emitter of transistor Tr2 charges the capacitor $C_1$ to the voltage Vt and continues to charge the capacitor to this voltage as the wheel velocity varies. At the same time the voltage g appears at the emitter-grounded transistors Tr5 and Tr6. The emitter-collector circuits of transistors Tr5 and Tr6 are connected directly to the emitter of transistor Tr1 and across to capacitor $C_1$, and behave as current amplifiers. The transistors Tr1 and Tr2 behave as voltage amplifiers.

In its current amplifier operation, the transistor Tr5 produces a collector current flow proportional to the output voltage g of the set deceleration generator. Thus, transistor Tr5 forms a circuit for furnishing a bypass current proportional to the voltage g around the capacitor $C_1$. The transistors Tr1 and Tr2 operate as voltage amplifiers of high mu factor. The transistor Tr2 acts as a voltage source to charge the capacitor $C_1$ to a level Vt corresponding to the voltage V and the wheel velocity. This continues until the voltage V tries to cause the voltage Vt at the emitter of transistor Tr2 and across the capacitor $C_1$ to drop faster than the transistor Tr5 is capable of discharging the capacitor $C_1$ because of the voltage g. At that point, the capacitor C discharges only at the rate established by the transistor Tr5. Thus the voltage source formed by the transistor Tr2 exhists only as long a Vw is not less than Vt.

This operation is illustrated by the curves of FIGS. 3 and 4. Here the curves in FIG. 3 illustrate the variation of the voltage V corresponding to the wheel velocity as derived from the wheel velocity generator 30 and Zener diode ZD. The voltages Vt and Ve caused by the voltage drop across the base emitter junctions of the transistors Tr1 and Tr2 are substantially identical until a rapid drop in the value Vt is prevented by the limited discharge capability of the capacitor $C_1$ because of the transistor Tr5. FIG. 4 illustrates the change in fluid pressure of the master cylinder and the brake cylinder during various travelling conditions.

Under normal travel conditions, when the brake is not applied, the brake fluid pressure is substantially 0 until a time $t_1$. The velocity V appearing at the output of the generator 30 and at the bases of transistors Tr1 and Tr2 remains nearly constant between the times 0 and $t_1$. The voltages Vt and Vw also remain substantially constant or follow the value of the voltage V at a level less than the voltage V by a value $V_{BE}$. When a pressure is applied on the brake fluid and increases linearly from the time $t_1$, the wheel velocity voltage V gradually decreases and the emitter voltages Vw and Vt of the transistors Tr1 and Tr2 decrease correspondingly. As long as the voltage drop rate of the voltage Vt is smaller than the voltage drop rate permitted in the capacitor $C_1$ by the bypass current in the transistor Tr5, the transistor Tr2 continues to determine the voltage at the junction of the capacitor $C_1$ and the emitter of transistor Tr2. That is to say the transistor Tr2 then continues to operate as a unidirectional voltage source and the voltage at the upper end of the capacitor $C_1$ follows the voltage Vt at the emitter of the transistor Tr2.

When the wheel velocity voltage V drops rapidly at the time $t_2$, the voltage Vw at transistor Tr1 drops with it. The voltage Vt at transistor Tr2 attempts to drop with it. However, the capacitor is still charged and the transistor Tr5 limits its discharge capability to a rate determined by the voltage g. This at $t_2$, the voltage Vt, instead of following the voltage V, drops less rapidly. Almost immediately, the voltage V at the base of transistor Tr2 becomes lower than the discharging voltage across the capacitor $C_1$ and cuts off the transistor Tr2. At this point only the discharge current from the capacitor $C_1$ passes through the emitter-collector path of transistor Tr5. The discharge proceeds linearly with a slope G corresponding to the voltage drop. The discharge current from the capacitor $C_1$ is proportional to the voltage g developed by the transistor Tr5 so as to generate the slope G and reduce the voltage Vt linearly at the slope G. The slope G is determined by the voltage g applied from the set deceleration generator 34 to the base of transistor Tr5.

The time $t_2$ defines when the wheel deceleration has become greater than the preset deceleration. Therefore, the time $t_2$ at which the wheels are in danger of being locked can be determined. This is so because the voltage Vw at the emitter of transistor Tr1 is not inhibited fro falling at the rapid rate of the voltage V. This is so because only the transistor Tr6 forms a load for the emitter of transistor Tr1. Once the emitter of transistor Tr2 exhibits a voltage Vt, which departs from the voltage Vw, the difference in voltage can be detected. This is accomplished with high sensitivity by a differential amplifier composed of transistors Tr3 and Tr4 in comparator relationship. An emitter coupling resistor $R_3$ couples the transistors Tr3 and Tr4 in comparator relationship, and a load resistor $R_1$ forms an output terminal at the junction of the collector of the transistor Tr4.

When the voltages Vw and Vt are applied to the bases of transistors Tr3 and Tr4, and the voltage Vt exceeds the voltage Vw, the transistor Tr4 conducts. A signal proportional to the voltage Vt then issues to the pressure modulator 26 which reduces the pressure of the braking fluid on the basis of the signal received. A control circuit 36 connected to the collector of transistor Tr2 may be used to correct the preset deceleration of the set deceleration generator 34.

In operation the skid control system according to the invention causes the generator 30 to charge the capacitor $C_1$ to a value proportional to the wheel velocity as long as the wheel velocity change, that is to say the wheel deceleration, is small enough so that the transistor Tr5 can handle the discharge flow. Thus it charges as long as the wheel deceleration is smaller than the preset deceleration. However, when the wheel deceleration becomes greater than the preset deceleration, that is when the voltage Vt drops faster than the capacitor $C_1$ is able to discharge through the transistor Tr5, the capacitor $C_1$ discharges only as fast as it can through the transistor Tr5. Thus the capacitor $C_1$ is discharged without following the wheel velocity, and it is possible to compare the two voltages. In this manner, the desired deceleration is compared with an actual deceleration without the use of a wheel-velocity differentiation circuit.

In the embodiment of FIG. 2, the load circuit of transistor TR1 constitutes the transistor Tr6, which exhibits the same characteristics as the transistor Tr5. The same voltage g is applied to each. According to another embodiment of the invention, the transistor is replaced by a resistor having a value that conforms to the performance range of the transistor Tr6. Such a resistor $R_5$ is illustrated, as a detail in the environment of FIG. 2, in FIG. 5.

The transistors Tr1 and Tr2, which have the same characteristics, are selected to develop a differential voltage, they can then operate stably even if the ambient temperature is changed or power voltages varied. Under these circumstances, it is not necessary to provide a specific temperature compensation circuit.

The circuit of FIG. 2 can be considered as forming a bridge composed of four arms. Two adjacent arms are formed by the transistors Tr1 and Tr6, and two adjacent arms are formed by the transistors Tr2 and Tr5. The capacitor $C_1$ also forms part of the arm which includes the transistor Tr5. The comparator composed of transistors Tr3 and Tr4 then measures the voltage differences between the junctions at the pair of adjacent arms. In the embodiment of FIG. 5, the resistor $R_5$ constitutes the arm adjacent to the transistor Tr1.

It will of course be understood that the systems of FIG. 2 and FIG. 5 form a portion of a wheeled vehicle, such as an automobile, which the systems represent. The control 36 may be a manually adjustable voltage source or more complex mechanism. The same is true for the generator 34 which may be varied as desired.

The preceding and following description is made with respect to automobile brake systems, but may not be applicable to the brake systems of other vehicles and is not limited to the automobile.

In FIG. 6, a brake pedal 1' of another automobile A embodying features of the invention actuates a master cylinder 2'. A control unit 3' of the skid control system forming a part of the automobile and this invention electrically regulates a pressure modulator 4'. The latter intervenes between the brake cylinder 2' and a wheel cylinder 5' so as to control the pressure in the wheel cylinder. The control unit 3' responds electrically to the output of a velocity detector or generator 6' that senses the velocity of a wheel 7' which is controlled and stopped by the wheel cylinder 5'. The wheel 7' is understood here to represent one of a number of wheels of the automobile A embodying features of this invention and whose speed is controlled by the brake system disclosed herein. Other wheels of the vehicle are understood to be controlled by other wheel cylinders responding to the master cylinder 2' and the pressure modulator 4'.

Under normal travel conditions, when the skid control system forming a part of the brake system is not required to operate, the pressure of brake fluid supplied from the master cylinder 2' conforms to the amount of physical effort applied to the brake pedal 1'. This pressure is applied without change to the wheel cylinder 5' so as to produce a corresponding braking force. When emergency braking is applied on the pedal 1', there is danger of the wheel 7' locking due to a depletion of the frictional force between the wheel and the road surface. The control unit 3' then responds to the wheel velocity detected by the wheel velocity detector to issue a pressure reduction signal. By means of the latter the pressure modulator 4' shuts off or reduces the flow of brake fluid from the master cylinder 2. It then regulates the pressure of the fluid in the wheel cylinder 5'. By preventing the wheels from locking in this manner, the vehicle is brought to a halt within a minimum stopping distance.

In FIG. 7 changes in various coefficients of friction $\mu$ of wheels, such as the wheel 7', are plotted along the ordinate axis of rectangular coordinates, while the wheel slip ratio S is plotted on the abscissa. Thus FIG. 2 illustrates $\mu$-S curves that vary in ways depending upon road surface conditions or vehicle speed or both. A curve $a'_1$ in FIG. 2 illustrates a situation where the maximum coefficient of friction $\mu$ is obtained at a wheel slip ratio Sc. Other curves exhibit maximum coefficients of friction at slip ratios less than Sc. The invention predetermines and utilizes a deceleration curve conforming to the road surface having the maximum coefficient of friction.

FIGS. 8a and 8b illustrate changes in the velocity V of the automobile A and the velocity Vw of the wheel 6' with respect to time as the pressure P of the brake fluid increases linearly with respect to time. In FIGS. 8a and 8b the time t is plotted along the abscissa. In FIG. 8a the wheel velocity Vw' and the vehicle velocity are plotted along the same ordinate. In FIG. 8b the pressure P of the brake fluid is plotted along the ordinate. As the pressure P of the brake fluid increases, as a result of pressure on the pedal 1, the velocity Vw' of the wheel gradually deviates from the vehicle velocity. This gradually increases the slip ratio. After the maximum coefficient of friction is reached at the time $t_2$, the wheel velocity decreases, thus increasing the deceleration rapidly. The deceleration of the wheel 7' at the time when the maximum coefficient of friction is reached, is shown by the slope $\alpha$ of the wheel velocity. Thus, if the wheel 7' is decelerated with the deceleration $\alpha$ under the above described road surface conditions and vehicle velocity, the wheel will always decelerate with maximum coefficient of friction. According to a feature of the invention, the pressure of the brake fluid is reduced with a slope corresponding to the deceleration $\alpha$ by detecting the time $t_2$ when the wheel velocity decreases rapidly. FIGS. 7, 8a and 8b are plotted without showing the effects of modulator 4'.

Figure 9:
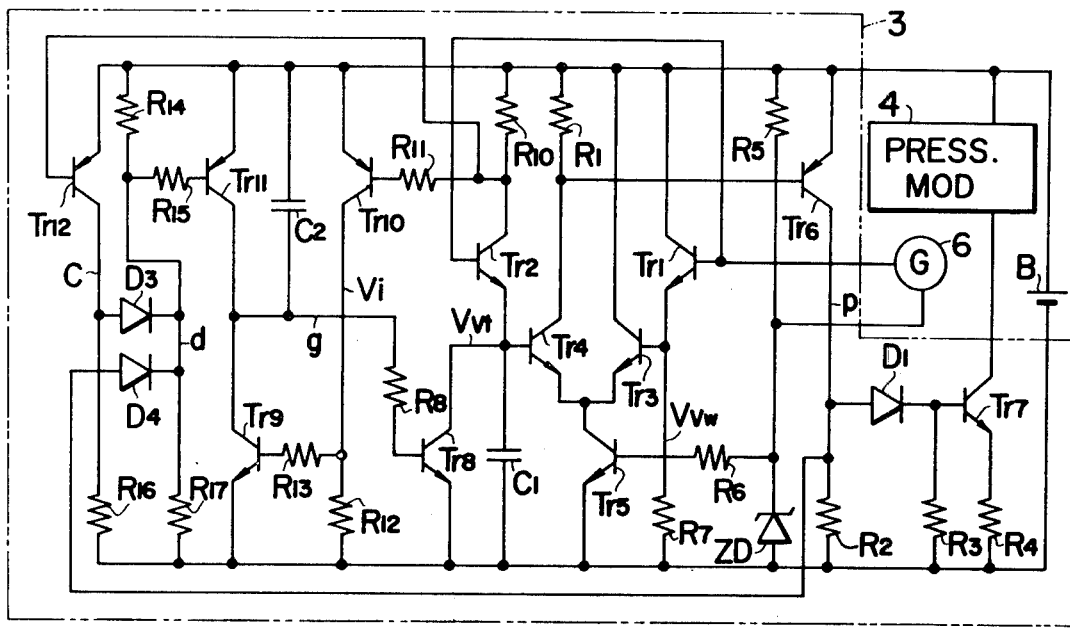
FIG. 9 is a schematic diagram illustrating the control unit and other members embodying features of the invention and forming a part of the system in FIG. 1.

FIG. 9 illustrates an embodiment of the control unit 3'. In FIG. 9 a transistor Tr1' of the control unit 3' receives a velocity dependent signal from the wheel velocity detector 6' at its base. The varying wheel velocity is biased to a level suitable for the base of transistor Tr1' by a constant voltage network composed of a resistor $R_5'$ that energizes a Zener diode. The transistor Tr1' is connected in common collector emitter follower configuration and produces a voltage Vvw proportional to the wheel velocity Vw across an emitter load resistor $R_7'$. The wheel velocity detector $6'$ also applied a voltage to the base of a transistor $Tr2'$. The collector-emitter circuit of the latter charges a capacitor $C_{10}$ through a resistor $R_{10}'$. The capacitor $C_{10}$ forms a wheel velocity setting control.

The collector-emitter path of the transistor $Tr2'$ charges the capacitor $C_{10}$ to a voltage Vvt' which normally corresponds to the wheel velocity Vw'. Since the voltages applied to the bases of transistors $Tr1'$ and $Tr2'$ are substantially the same, the emitter voltages tend to be substantially the same. Thus the transistor $Tr2'$ tends to charge the capacitor $C_{10}$ to a voltage Vvt' comparable to the voltage Vvw'. As long as the voltage Vvw' exceeds the voltage Vvt', the capacitor will tend to charge.

Transistors $Tr3'$, $Tr4'$ and $Tr5'$ form a differential amplifier. In this differential amplifier the emitter collector path of the transistor $Tr5'$ forms a coupling impedance. The one of the transistors $Tr4'$ and $Tr5'$ having a higher base voltage conducts. When the voltage Vvt' is higher than the voltage Vvw', conduction of the transistor $Tr4'$ develops a voltage drop in a collector resistor $R_1'$ of the transistor $Tr4'$. This voltage drop biases a p-n-p transistor into conduction and develops a rising voltage p across a resistor $R_2'$. The rising voltage drives a transistor $Tr7'$ into conduction through a diode $D_1$. This increases the voltage across the pressure modulator $4'$ and passes a pressure reduction signal to the pressure modulator. Biasing resistors $R_3'$ and $R_4'$ normally bias the base and emitter of transistor $Tr7'$. The constant voltage circuit composed of Zener diode ZD' and resistor $R_5'$ forms a constant current circuit with a resistor $R_6'$ to furnish the base emitter circuit in the emitter coupling resistor $Tr5'$ with a constant supply of base current.

The emitter collector circuit of a transistor Tr8 forms a discharge path across the capacitor $C_{10}$. This discharge path constitutes a correcting means. The discharge path of the emitter collector circuit of transistor $Tr8'$ is a direct path across the capacitor $C_{10}$. The conductivity of the path is determined by a voltage g appearing across the capacitor $C_{20}$ and supplied through a resistor $R_8'$ to the base of the transistor $Tr8'$. A transistor $Tr9'$ charges the capacitor $C_{20}$. The latter transistor is controlled by the conduction of a p-n-p transistor $Tr10'$ through a collector resistor $R_{12}'$ and a coupling resistor $R_{13}'$. The collector of transistor $Tr10'$ forms a voltage Vi' across the resistor $R_{12}'$. Thus, when a voltage drop proportional to the charging current of the capacitor $C_{10}$ appears at the base of the transistor $Tr10'$ by virtue of a coupling resistor $R_{11}'$, the base of the transistor $Tr9'$ receives a current proportional to the charging current of the capacitor $C_{10}$ through the resistor $Tr10'$. As a result, the capacitor $C_{20}$ is supplied with a charging current proportional to the charging capacitor. This reduces the voltage g which is adjusted by charging or discharging the capacitor $C_{20}$.

A transistor $Tr11'$ possesses a collector emitter circuit which forms a discharge path across the capacitor $C_{20}$. Two resistors, $R_{14}'$ and $R_{17}'$, form a voltage divider across the direct current supply of the battery B. A biasing resistor $R_{15}'$ applies the divided voltage d to bias the base of transistor $Tr11'$. Conduction of the transistor $Tr11'$ is controlled depending upon the magnitude of the voltage d at the junction of resistors $R_{14}'$ and $R_{17}'$. Connected in parallel to the resistor $R_{14}'$ is a series circuit composed of a transistor $Tr12'$ and a diode $D_3$. The transistor $Tr12'$ receives a base biasing voltage from the lower end of the resistor $R_{10}'$, that is the collector voltage c of the transistor $Tr2'$. A resistor $R_{16}'$ is the collector biasing resistor of the transistor $Tr12'$. Thus, the transistor $Tr12'$ and the diode $D_3$ affect the potential d formed by the voltage divider of resistors $R_{14}'$ and $R_{17}'$. Also affecting the potential d is a diode $D_4$ connected between the potential d and the voltage p. The diodes $D_3$ and $D_4$ form an off-circuit. When the voltage p at the collector of transistor $Tr6'$ or the voltage c at the collector of transistor $Tr12'$ is high relative to the negative terminal of the source formed by the battery B, the voltage d will also become high and drive the transistor Tr11 into non-conduction. On the other hand, when the voltage d exhibits the voltage formed exclusively by the voltage divider resistors $R_{14}'$ and $R_{17}'$, the transistor $Tr11'$ conducts and the capacitor $C_{20}$ discharges. This increases the voltage g at one plate of the capacitor $C_{20}$.

The performance of the embodiment of the invention illustrated in FIG. 6 and 9 may best be understood from reference to FIGS. 10a through 10g. FIG. 10a illustrates the changing wheel velocity Vw' and compares it to the vehicle velocity V' as well as the velocity Vt' forming the deceleration curve or slope, as each one of these varies with time. FIG. 10b illustrates the pressure P' of the brake fluid in the wheel cylinder 5' after the pressure has been modulated by the pressure modulator 4'. FIGS. 10c–10g illustrate the wave forms of the voltages p, c, d, Vi', and g in FIG. 9.

When the vehicle proceeds under normal travel conditions between the times $t_0$ and $t_1$, the wheel velocity Vw' is equal to the vehicle velocity V and almost constant. The capacitor $C_{10}$ charges up to a voltage equal to the wheel velocity Vw' so as to make the voltage Vvt' equal to the voltage Vvw'. During this equality of the voltages the transistor $Tr2'$ is substantially non-conductive. This keeps transistor $Tr4'$ non-conductive, which in turn renders transistor $Tr6'$ and $Tr7'$ non-conductive or cut-off. With transistor $Tr7'$ cut-off, the pressure modulator 64 receives no pressure modulation signal. Simultaneously, the transistor $Tr10'$ receives its base voltage from the resistor $R_{10}'$ which carries substantially no current. Thus the transistor $Tr10'$ remains cut-off and serves to cut off the transistor $Tr9'$. Transistor $Tr12'$ also receives its base voltage from the resistor $R_{10}'$ and similarly does not conduct. However, the voltage divider composed of resistors $R_{14}'$ and $R_{17}'$ furnishes a forward biasing potential to the base of transistor $Tr11'$ and causes it to conduct. Thus the emitter collector circuit of the transistor Tr11 shortcircuits the capacitor $C_{20}$ and drives the voltage g at the lower plate of the capacitor $C_{20}$ to its maximum, that is to it most positive potential. This positive potential drives the transistor $Tr8'$ into conduction and serves to discharge the capacitor $C_{10}$. However, the transistor $Tr2'$ conducts enough to continously recharge the capacitor $C_{10}$. However, this conduction is not sufficient to turn on the transistor $Tr10'$, that is to render the transistor $Tr10'$ conductive.

In this manner the circuit maintains the voltage Vvt equal to the voltage Vvw'.

During the period between the times $t_1$ and $t_2$, the brake pedal 1 is applied for an emergency stop. The wheel velocity Vw' starts decelerating because of the increase in the pressure of the brake fluid in the master cylinder 2' and the wheel cylinder 5'. However, the wheel deceleration is still less than the preset deceleration established by the rate at which the transistor Tr8 discharges the capacitor $C_{10}$. That is to say, the transistor Tr8' discharges the capacitor $C_{10}$ faster than the voltage Vvt' tends to drop. Thus the voltage Vvt' can drop together with the voltage Vvw'. In this manner these two voltages remain equal. Thus during the period between the times $t_1$, and $t_2$, each of the transistors retain their same operating conditions as during the time period between times $t_0$ and $t_1$. The current flow caused by the transistor Tr2 through the resistor $R_{10}'$ causes an insufficient voltage drop to turn on the transistor Tr10'. The condition of the transistors Tr6', Tr12', Tr10' and Tr9' are such as to be analyzable as either conductive or non-conductive. Thus the voltages $p$, $c$ and Vi may be considered as logic signals which are either "high" or "low", or "1" or "0".

It is possible for the wheel velocity Vw' to drop more rapidly than the deceleration preset by the voltage $g$. This happens when the wheel velocity drops so rapidly that it drives the voltage Vvt' down faster than the transistor Tr8' is capable of discharging the capacitor $C_{10}$. The rate at which the transistor Tr8' discharges the capacitor $C_{10}$ is determined by the voltage $g$. This is because the transistor Tr8' is substantially a current amplifier whose emitter collector circuit carries current in proportion to the voltage $g$. At some point the voltage Vvt' may attempt, as a result of rapid deceleration, to drop faster than this preset rate. This occurs in FIG. 10 at the time $t_2$ when the coefficient of friction between the wheel and road surface reaches a maximum and the wheel velocity Vw' decreases rapidly. Since the voltage across the capacitor $C_{10}$ cannot discharge as fast as the voltage Vvt tends to drive it down, the voltage Vvt'is forced to remain at a higher potential, that is a more positive potential than the voltage Vvw'. The unbalance causes the transistor Tr4' to conduct. This drives the transistor Tr6' on, i.e. into conduction and causes the collector voltage $p$ of the transistor Tr6' to assume a logic 1. The voltage $p$ drives the transistor Tr7' into conduction through the diode $D_1$. The collector voltage of the transistor Tr7' signals the pressure modulator 4' to reduce the pressure P of the brake fluid. At the same time the high potential, that is the positive potential $p$, is applied through the diode $D_4'$ to the resistor $R_{15}'$ at the base of transistor Tr11'. This renders the transistor Tr11 non-conductive.

The signal to the pressure modulator to reduce the pressure P'of the brake fluid reduces the braking force. The wheel velocity then increases, in response to this reduction of pressure, to approach the vehicle velocity. At the time $t_3$ it exceeds the deceleration curve established by the voltage $g$ and the transistor Tr8'. This deceleration curve decreases with a fixed slope determined by the voltage $g$ from the time $t_2$. This is because the transistor Tr8' discharges the capacitor $C_{10}$ at a constant rate established by the voltage $g$. The voltage Vvt eventually reaches the voltage Vvw at the time $t_3$. This eliminates the unbalance at transistors Tr3' and Tr4', and transistor Tr4' stops conducting. This turns off transistor Tr6' to change the logic level of voltage $p$ to 0 and turn off transistor Tr7'. This non-conduction of transistor Tr7' eliminates the pressure reduction signal in the pressure modulator 4' and allows the modulator to increase the pressure P' as shown in FIG. 10$b$ by the solid line.

However, at this time before the wheel velocity stabilizes or reverses in response to the changing pressure, it still increases and tends to raise the value of the voltage Vvt above the charge level of the capacitor. This causes the transistor Tr2' to conduct heavily enough to charge the capacitor $C_{10}$ and to produce conduction of the transistor Tr2' and thereby cause a voltage drop across the resistor $R_{10}'$. This applies forward potentials to the bases of transistors Tr10' and Tr12'. They thus conduct and cause the voltages $c$ and Vi' to exhibit a logic 1. As a result the diode $D_3$ applies the voltage $c$ to the base of transistor Tr11' to overcome its normal biasing potential and drive it into non-conduction. The voltage Vi' responds to the conduction of the transistor Tr10' by driving the transistor Tr9' into conduction. This causes capacitor $C_{20}$ to charge and decrease the voltage $g$. The latter reduction reduces the conduction of the emitter-collector current path of transistor Tr8' and allows the capacitor $C_{10}$ to charge gradually. As a result the voltage Vvt is corrected at a rate that follows the increase in the wheel velocity Vw'. More specifically, the voltage Vvt' changes at a rate corresponding to the decrease in the voltage $g$.

Eventually, the increased pressure P' of the brake fluid in the brake cylinder 5 stops the increase in the velocity Vw' so that it reaches a maximum at a time $t_4$. The wheel velocity Vw' starts to decrease again due to the increased braking force. At this time the transistor Tr2' stops charging the capacitor $C_{10}$ and in effect becomes essentially non-conductive. This turns off the transistor Tr10' as well as the transistor Tr9' and interrupts charging of the capacitor $C_{20}$. It also cuts off the transistor Tr12', that is it renders the transistor non-conductive and allows the voltage divider $R_{14}'$ and $R_{17}'$ to bias the transistor Tr11'into conduction. The latter then serves to act as a constant current discharge path for the capacitor $C_{20}$. This increases the voltage $g$ almost linearly. Consequently, the conductivity of the transistor Tr8' increases so as to increase th discharge rate of the capacitor $C_{10}$. The voltage Vvt'is then corrected so that its slope increases in proportion to the decrease of the wheel velocity Vw. Eventually, as the pressure in the cylinder 5' decreases the velocity of the wheel 7', the deceleration of the wheel exceeds the new deceleration determined by the voltage drop in the capacitor $C_{10}$ and by the new voltage $g$. This occurs at the time $t_5$. When the wheel exceeds the slip ratio at which the coefficient of friction is maximum, the wheel velocity setting means furnishes a pressure reduction signal to the pressure regulator. That is to say as the drop in wheel velocity causes the voltage Vvt' to attempt to drop fashter than the transistor Tr8' is capable of discharging the capacitor $C_{10}$ the transistor Tr4' conducts. The transistor Tr7' is then caused to furnish a pressure reduction signal to the pressure modulator 4' by the conduction of transistor Tr6'.

As before the decrease in the pressure of the brake fluid in the wheel cylinder 5' decreased deceleration and causes a rise in the wheel velocity until the voltage Vvw' again reaches the voltage Vvt established across the capacitor $C_1'$. At that point the signal to the pressure modulator 4' ends and the high brake pressure applied by the modulator again appears in the wheel cylinder 5'. This occurs at the time $t_6$. Between the times $t_6$ and $t_7$ the transistor Tr2' exhibits an emitter voltage which is attempting to rise faster than the voltage of the capacitor $C_{10}$ and therefore conducts heavily. The heavy conduction results in a reduction of the voltage $g$ by virtue of the charging produced at the more negative plate of the capacitor $C_{20}$ by the transistor Tr9'. A second adjustment of the voltage g occurs during the period between the times $t_7$ and $t_8$. This occurs because the effect of fluid pressure in the wheel cylinder 5' causes the wheel 7' again to reach a maximum and start to slow down. The falling velocity sensed by the generator 6' appears as a falling potential Vvt' at the emitter of transistor Tr2' and across the capacitor $C_{10}$. This ends the charging of the capacitor $C_{10}$ by the transistor Tr2' and initiates resumption of conduction by the transistor Tr11'. The latter discharges capacitor $C_{20}$ and raises the level of the voltage g until the time $t_8$. At that moment the voltage Vvt, because of the deceleration actuated by the full pressure of the pedal 1', is attempting to decrease faster than the transistor Tr8' is capable of discharging the capacitor $C_{10}$. The unbalance in the differential amplifier composed of transistors Tr3' and Tr4' causes conduction of the transistor Tr6' as well as Tr7' to produce a pressure reduction signal to the pressure modulator 4'. Conduction of the transistor Tr6' again produces a more positive signal at the junction of the resistors $R_{14}'$ and $R_{17}'$ so as to cut off the conduction of the transistor Tr11' and thereby stop discharge of the capacitor $C_{20}$. The cycle is again repeated between times $t_8$ and $t_9$ and times $t_9$ and $t_{10}$.

The above-mentioned adjustments or corrections of the voltage g produces a mean value $g_1$ which conforms to the actual road surface conditions. In this way the time during which the wheel velocity Vw' is decreased with an optimum deceleration, that is with a deceleration conforming to the road surface conditions, is extended. The velocity decrease beyond the slip ratio, at which the coefficient of friction is maximum, is decreased. Consequently, the vehicle, namely the automobile A is brought to a halt with its brakes near an average slip ratio at which the coefficient of friction is maximum.

When the wheel velocity Vw' is restored and exceeds the deceleration curve Vt', that is when the voltage Vvw exceeds the voltage Vvt', the transistor Tr7' is rendered non-conductive and an increased pressure signal is passed to the pressure modulator 4'. It is possible to hasten the restoration of the wheel velocity by maintaining the pressure reduction signal beyond a time such as $t_3$. This is done, as shown in FIG. 11, by applying the positive voltage c that turns off the transistor TR11', to the base of transistor Tr7' by means of a diode $D_2$. This voltage then turns on the diode Tr7' and continues the pressure reduction signal. The circuit in FIG. 11 is an abbreviated illustration of the circuit in FIG. 9, but with the addition of a diode $D_2$. Only those portions of the circuit 3' in FIG. 9, which are necessary for illustrating the connections of the diode $D_2$, are shown. In FIG. 11 the voltage c is applied to the base of the transistor Tr7' which then furnishes a pressure reduction signal to the pressure modulator 4', even when the voltage c exhibits a logic value 1. Thus the pressure of the brake fluid changes in FIG. 11 according to the path shown by the dotted line in FIG. 10b. An increased pressure signal is applied to the pressure modulator 4' only when the voltages p and c have a logic value 0.

Another method of accomplishing a similar purpose is to include a retaining value in the pressure modulator 4'. If this is done, the pressure P of the brake fluid is maintained at a constant value between the times $t_3$ and $t_4$ and times $t_6$ and $t_7$ as shown by the dot-dash lines in FIG. 10b.

Figure 12:
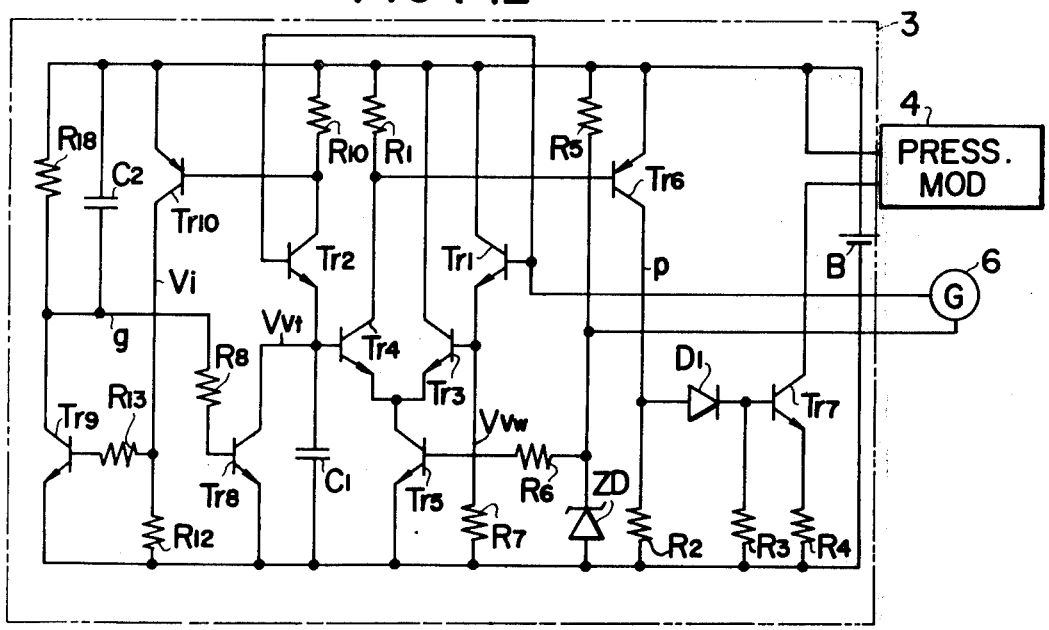
FIG. 12 is a schematic diagram of still another embodiment of the control unit in FIG. 6.

FIG. 12 illustrates another circuit which may be used as the control unit in FIG. 6 and which embodies features of the invention. In FIG. 12 the control unit 3' is in part identical to the control unit 3' shown in FIG. 9. The main difference resides in the elimination of transistors Tr11', Tr12', the resistors $R_{11}'$, $R_{14}'$, $R_{15}'$, $R_{16}'$ and $R_{17}'$ which form the discharge circuit of the capacitor $C_{20}$, and the diodes $D_3$ and $D_4$ of the off-circuit which form the voltages c and d. Instead, a resistor $R_{18}'$ connected across the capacitor $C_{20}$ forms the discharge circuit of the capacitor. Thus the capacitor $C_{20}$ is discharged by means of the resistor $R_{18}'$ when the transistor Tr9' is not conducting. The capacitor $C_{20}$ thus performs a first adjusting step that increases the voltage g along the curve g' of FIG. 5g.

This embodiment of the skid control system operates in a manner similar to the skid control system using the control unit 3' of FIG. 9. However, here instead of the capacitor $C_{20}$ being discharged by an alternately conductive and non-conductive transistor Tr11', the capacitor $C_{20}$ is discharged continuously by a resistor $R_{18}'$. The capacitor $C_{20}$ is charged as in FIG. 4 when the transistor Tr2' conducts heavily, thereby turning on the transistor Tr10' and the transistor Tr9'.

A pressure reduction signal in FIG. 12 is generated in the same manner as in FIG. 9. That is when the voltage Vvt' attempts to drop faster than the transistor Tr8' is capable of discharging the capacitor $C_{10}$ conduction of transistor Tr4' turns on the transistor Tr6' which in turn turns on the transistor Tr7'.

The embodiment of the invention as illustrated in part in FIG. 7 may be modified to change the pressure P' of the brake fluid so as to follow the path shown by the dotted line in FIG. 10b. This speeds up the restoration of the wheel velocity Vw'. This is accomplished by modifying the circuit of FIG. 12 with the addition of the diode $D_2$ as shown in FIG. 13. The diode $D_2$ applies the voltage Vi, appearing at the collector of transistor Tr10', across the base-biasing resistor $R_3'$ of the transistor Tr7'. This results in application of a pressure reduction signal to the pressure modulator 4' even when the voltage p exhibits a logic value 0, as long as Vi exhibits 1.

According to yet another embodiment of the invention the curve shown by dot-dash lines in FIG. 10b is obtained as shown in FIG. 14. Here the voltage Vi' at the collector of transistor Tr10' is applied to the base of a transistor Tr7a whose base and collector are biased by resistors $R_{3a}$ and $R_{4a}$. The remainder of the circuit in FIG. 14 corresponds identically to the circuit in FIG. 12. The emitter of transistor Tr7a energizes a retaining value 60 in the pressure modulator 4', which is illustrated in more detail in FIG. 10. The voltage Vi, which is substantially 0 until the time $t_3$ rises at that time to turn on the transistor Tr7a. This operates the retaining valve 60.

In FIG. 15 the pressure modulator 4 includes a pressure modulating unit 40, a change-over valve 50 and a retaining valve 60. The pressure modulating unit 40 is composed of a cylinder 41, a diaphragm 42 dividing the larger bore portion of the cylinder 41, a piston 43 projecting from the diaphragm 42, a seal 44, a check ball 45 and springs 46 and 48. The cylinder 41 is divided by the diaphragm 42 into a working-chamber 41a, and a pressure-receiving chamber 41b. A modulating chamber 41c receives fluid from an introduction chamber 41d. The change-over valve 50 includes a cylinder 51, a valve body 52 and an electromagnetic coil 53. The signal developed by a transistor Tr7′ of the control unit 3′ normally energizes the coil 53. The latter, when excited, holds the valve body 52 in the position illustrated. Atmospheric pressure is thereby introduced from a connecting port 51c through a port 51a and the retaining valve 60 into an entrance port 47a that leads to the working chamber 41a of the pressure modulating unit 40. When the coil 53 is deenergized, a spring not shown moves the valve body 52 downwards so as to cause communication between the connection port 51a and the connection port 51b. This results in fluid connection of both the working chamber 41a and pressure receiving chamber 41b to a pressure receiving source 70. In the pressure modulating unit, brake fluid from the master cylinder is directed through a port 49 into the introduction chamber 41d and through the modulating chamber 41c. The brake fluid then passes to the wheel cylinder 5 through a connection port 47c. When the pressure modulator 4 is used with control units 3′, as illustrated in FIGS. 9, 11, 12 and 13, the retaining valve 60 substantially behaves as an open port or may be eliminated entirely. The operation of the pressure modulator 4, when operating with the control units 3 of FIGS. 9, 11, 12 and 13, has its coil 53 deenergized under normal travel conditions. Under these circumstances, both chambers 41a and 41b are in the pressure-receiving state, that is, they are under vacuum pressure from source 70. Therefore, the spring 48 presses the diaphragm 42 to the right and the tip of the piston 43 pushes a check ball 45 open to the right. Consequently, brake fluid from the master cylinder communicates through the chambers 41c and 41d to the wheel cylinder. This applies brake fluid to the wheel cylinder with the pressure conforming to the amount of physical effort applied to the brake pedal 1′. On the other hand, a pressure reduction signal issued from the control unit 3′ excites the magnetic coil 53. This lifts the valve body or piston 52 to the position shown, and atmospheric pressure is supplied into the work-chamber 41a. The diaphragm 42 and piston 43 move to the left to allow a spring 46 to close the check ball 45. This shuts off the flow of brake fluid to the wheel cylinder. The movement of the piston 43 to the left increases the volume of the modulating chamber 41c. This decreases the pressure of brake fluid to the wheel cylinder 5′. Termination of the pressure reduction signal at this time deenergizes the electromagnetic coil 53 and causes the piston 43 to move to the right into a range where the brake line is still closed by the check ball 45. As a result, the volume of the modulating chamber 41c is decreased, and the pressure of brake fluid to the wheel cylinder 5′ is increased.

At the next pressure reduction signal, electromagnetic coil is excited and the piston 43 moves to the left within a range where the brake line is closed by the check ball 45. This increases the volume of the modulating chamber 41c and decreases the pressure of the brake fluid. As described, the pressure modulating unit increases or decreases the pressure of brake fluid through movement of the piston 43 within the range where the brake line remains closed by the check ball 45.

In the retaining valve 60, a cylinder 61 receives a valve body 62 which is moved by an electromagnetic coil 63. Connection ports 61a and 61b connect the retaining valve 60 to the change-over valve 50 and the working chamber 41a of the pressure modulating unit 40. The retaining valve 60 makes it possible for the pressure to follow the path illustrated in FIG. 10b by the horizontal dot-dash lines between the times $t_3$ and $t_4$ and between the times $t_6$ and $t_7$. According to one embodiment of the invention, this is accomplished as shown in FIG. 16. FIG. 11 illustrates a portion of the control unit 3′ which is otherwise comparable to the control unit 3′ of FIG. 9. However, here the voltage c across the resistor $R_{16}$ is applied to the relay coil 63.

According to the embodiment of the invention illustrated in FIG. 14, a current is applied to the electromagnetic coil 63 through the transistor Tr7a. Here it is the voltage Vi′, which is applied to the base of the transistor Tr7a. In this manner, the electromagnetic coil 63 is excited and the valve body 62 moved upwardly. This shuts off the supply of atmospheric pressure into the working chamber 41a and stops the movement of the diaphragm 42. In this way, the pressure of the brake fluid is maintained at a constant value for a fixed period of time.

In the skid control system according to this invention the wheel velocity detector 6′ detects the wheel velocity. The wheel velocity setting means of the control unit 3′ compares the wheel deceleration and the preset deceleration by charging or discharging the capacitor $C_{10}$. This produces or stops a pressure reduction signal. The first and second correcting or adjusting means in the capacitor adjust the deceleration curve in accordance with the wheel deceleration by regulating the voltage g. The pressure modulator 4′ regulates the pressure of the braking fluid depending upon the presence of a pressure reduction signal. Consequently, the wheels are slowed or receive a braking force so that the average slip ratio corresponds to the point where the coefficient of friction is maximum. The vehicle is thus stopped in the smallest stopping distance dependng upon the road surface conditions. This is done without the wheels locking. According to still another embodiment of the skid control system according to the invention, the electronic circuits shown in the embodiments are replaced with mechanical hydraulic or pneumatic elements. For example, when the circuits are replaced with mechanical elements, the capacitor $C_{10}$ is replaced with a fly wheel. The transistor Tr8′, that discharges the capacitor $C_{10}$ is replaced with a friction brake for the deceleration of the fly wheel. The transistor Tr2′, which charges the capacitor $C_{10}$, is replaced with one-way clutch for the acceleration of the fly wheel. The differential amplifier is then replaced by a governor mechanism.

As disclosed herein, the discharge circuit for the capacitor $C_{20}$, namely composed of the transistor Tr11′, is biased normally by the voltage divider composed of resistors $R_{14}′$ and $R_{17}′$ into a conductive condition so as normally to discharge the capacitor $C_{20}$. This effectively raises the value of g to a nominally high voltage. This permits a comparatively high rate of velocity decrease. The invention is based upon the recognition that the decrease in wheel velocity becomes measurably greater when the slip ratio reaches the point of maximum coefficient of friction. At this point, the system reduces the braking force until the wheel velocity corresponds to the wheel velocity which is established by the desired velocity decrease. The circuits then decrease the value of the voltage g, that is the desired deceleration or rate of decrease on the basis of how long the wheel velocity takes to reach a peak in response to an increased brake pressure. This change is modified on the basis of the amount of time it takes for the slip ratio to reach the point of maximum coefficient of friction.

The pressure modulator illustrated in FIG. 15 is only an example of a pressure modulator suitable for use in the system of FIG. 6. Other pressure modulators may be used. For example, any valve that slowly diverts the pedal pressure during the pressure reduction signal, but that gradually reapplies the pedal pressure to build up toward the pedal pressure, may be used.

In the pressure modulator of FIG. 15, the piston 43 does not unseat the ball 44 in the intervals between pressure reduction signals, such as those between times $t$ and $t_{10}$ in FIGS. 10a through 10g. This is because a new pressure reduction signal occurs before the piston has a chance to reach the ball 44.

While embodiments of the invention have been described in detail, it will be obvious to those skilled in the art that the invention may be embedded otherwise without departing from its spirit and scope.

What is claimed is:

1. For a vehicle with wheels and a brake, a brake control system for regulating the braking effect of the brake, comprising:

detector means for producing a variable detector signal corresponding to the speed of a wheel, storage means coupled to said dectector means for storing the detector signal and for forming a reference signal representing a momentary reference speed having a changeable maximum variability corresponding to a changeable desired deceleration, brake modifying means coupled to said detector means and said storage means for comparing the reference signal with said dectector signal and for producing a brake relieving signal when the detector signal and said reference signal have a given relation indicating that the wheel speed has decelerated faster than the given deceleration, whereby the brake relieving signal decreases the deceleration of the wheel and may cause the wheel speed to be greater than the momentary reference speed, said dectector means responding to changes in the wheel speed and said storage means responding to said detector means when the wheel speed is greater than the momentary reference speed to produce given changes in the reference signal, coupling means coupled to the storage means and said brake modifying means for causing the brake modifying means to continue the brake relieving signal during the given changes in the reference signal said coupling means including a transistor coupled to said storage means for responding to the given changes in the storage means and a diode coupling said transistor to said brake modifying means.

2. A device as in claim 1, wherein said braking modifying means includes a valve, coil coupled to said storage means and a valve to produce the brake relieving signal.

3. A device as in claim 1, wherein said storage means include a capacitor, a transistor connected across said capacitor for discharging said capacitor, a second transistor and a resistor serially connected with said capacitor for charging said capacitor, the current through said second transistor and said resistor being indicative of the given changes.

4. A device as in claim 1, where said brake modifying means includes a transistor amplifier and a hydraulic pressure modulator 5. A device as in claim 4, wherein said coupling means includes a transistor coupled to said comparator means for responding to the given changes in the comparator means and a diode coupling said transistor to said brake modifying means said diode being connected to said amplifier.

6. For a vehicle with wheels and a brake, a brake control system for regulating the braking effect of the brake, comprising: detector means for producing a variable detector signal corresponding to the speed of a wheel, storage means coupled to said detector means for storing the detector signal and for forming a reference signal representing a momentary reference speed having a changeable maximum variability corresponding to a changeable desired deceleration, brake modifying means coupled to said detector means and said storage means for comparing the reference signal with said detector signal for producing a brake relieving signal when the dector signal and said reference signal have a given relation indicating that the wheel speed has decelerated faster than the given deceleration, whereby the brake relieving signal decreases the deceleration of the wheel and may cause the wheel speed to be greater than the momentary reference speed, said detector means responding to changes in the wheel speed and said storage means responding to said detector means when the wheel speed is greater than the momentary reference speed to produce given changes in the reference signal, control means coupled to the storage means and responsive to the given changes for storing a control signal corresponding to the given changes and for varying the maximum variability of the reference signal in response to the given changes and coupling means coupled to said storage means and said brake modifying means for constraining the brake relieving signal to continue during the given changes in the reference signal.

7. A device as in claim 6, wherein said coupling means includes a transistor coupled to said storage means for responding to the given changes in the storage means and a diode coupling said transistor to said brake modifying means.

8. A device as in claim 6, wherein said control means includes a valve coil coupled to said storage means and to said brake modifying means for actuating said brake modifying means.

9. A device as in claim 6 wherein said storage means include a capacitor, a transistor connected across said capacitor for discharging said capacitor, a second transistor and a resistor serially connected with said capacitor for charging said capacitor, the current through said second transistor and said resistor being indicative of the given changes said first transistor being responsive to said control means.

10. A device as in claim 6, wherein said control means includes a valve coil coupled to said storage means and to said brake modifying means for actuating said brake modifying means said hydraulic pressure modulator including a valve, said coil being coupled to said valve.

* * * * *

UNITED STATES PATENT OFFICE
CERTIFICATE OF CORRECTION

Patent No. 4,125,296  Dated Novemeber 14, 1978

Inventor(s) TAKESHI OCHIAI

It is certified that error appears in the above-identified patent and that said Letters Patent are hereby corrected as shown below:

In the heading of the Patent [73] and lines 25, 33, 43 of column 17 and lines 1 and 24 of column 18 should read as follows:

[73] Assignee: Toyota Jidosha Kogyo Kabushiki Kaisha, Aichi-ken, JAPAN

Column 17, line 25:
"...age means coupled to said detector means for..."
line 33:
"...reference signal with said detector signal and for..."
line 43:
"...said detector means responding to changes in the..."

Column 18, line 1:
"...4. A device as in claim 1, wherein said brake modifying..."
line 24:
"...ducing a brake relieving signal when the detector..."

Signed and Sealed this

First Day of May 1979

[SEAL]

Attest:

RUTH C. MASON
Attesting Officer

DONALD W. BANNER
Commissioner of Patents and Trademarks